US008504281B2

(12) United States Patent
Brennan

(10) Patent No.: US 8,504,281 B2
(45) Date of Patent: Aug. 6, 2013

(54) METHOD AND SYSTEM FOR FLIGHT SUBSTITUTION AND REROUTE

(75) Inventor: Michael Christopher Brennan, Reston, VA (US)

(73) Assignee: Metron Aviation, Inc., Dulles, VA (US)

( * ) Notice: Subject to any disclaimer, the term of this patent is extended or adjusted under 35 U.S.C. 154(b) by 310 days.

(21) Appl. No.: 13/080,329

(22) Filed: Apr. 5, 2011

(65) Prior Publication Data

US 2011/0251781 A1 Oct. 13, 2011

Related U.S. Application Data

(60) Provisional application No. 61/322,811, filed on Apr. 9, 2010.

(51) Int. Cl.
*G06F 19/00* (2011.01)

(52) U.S. Cl.
USPC .................................... 701/120; 701/4; 701/3

(58) Field of Classification Search
USPC ................... 701/4, 120, 3, 1, 10, 14, 15, 122, 701/300; 342/36, 33; 385/100; 257/209
See application file for complete search history.

(56) References Cited

U.S. PATENT DOCUMENTS

| | | | | |
|---|---|---|---|---|
| 6,606,553 | B2 * | 8/2003 | Zobell et al. | 701/120 |
| 7,702,427 | B1 * | 4/2010 | Sridhar et al. | 701/4 |
| 8,290,696 | B1 * | 10/2012 | Sridhar et al. | 701/120 |
| 2003/0078719 | A1 * | 4/2003 | Zobell et al. | 701/120 |

* cited by examiner

*Primary Examiner* — Behrang Badii

(57) ABSTRACT

Flight substitution and reroute is accomplished based on frequently updated flow constrained areas and a flight substitution system to minimize the impact of severe weather on the NAS. Each flight is assigned a route, a FCA controlled time of arrival (FCA_CTA) slot, a controlled time of departure, and a destination controlled time of arrival, wherein the flights are sorted according to the FCA_CTA slot to pass sequentially through an FCA. When a flight is re-routed, the subsequent flight FCA_CTA is updated with the FCA_CTA slot made available by the preceding flight. If such an update is not feasible, then the subsequent flight FCA_CTA is updated according to a slot credit substitution give-away method. The benefits and costs for rerouting a flight out of an AFP are input to an optimization framework for providing the best flight time and flight reroute options.

20 Claims, 10 Drawing Sheets

METHOD AND SYSTEM FOR FLIGHT SUBSTITUTION AND REROUTE

REFERENCE TO EARLIER APPLICATION

This application claims the benefit of U.S. Provisional Application No. 61/322,811 filed Apr. 9, 2010.

FIELD OF THE INVENTION

The present invention generally relates to the field of air Traffic Flow Management System (TFMS) in an Airspace Flow Program (AFP). More particularly, the present invention relates to methods and systems for air traffic flow reroute and flight substitution among multiple airlines to minimize the impact of severe weather conditions on the National Airspace System (NAS).

BACKGROUND OF THE INVENTION

In air transportation and Traffic Flow Management (TFM) domain an AFP is referred to a strategy for controlling the departure time and route selection of a set of aircraft constrained by en route airspace capacity constraints, e.g., due to severe weather conditions or over capacitated airspace resource. AFPs allow traffic management specialists to define a capacity-constrained en route resource, such as a fix, sector, or arbitrary region of airspace. The AFP is a TFM tool for strategically mitigating en route congestion in the NAS. The traffic management initiatives are often used to meter traffic into the Flow Constrained Area/Flow Evaluation Area (FCA/FEA), which indicate areas of limited capacity.

AFP algorithms provide the aircraft planning to use the limited capacity resource and assign departure times that match the demand of the resource to its predicted capacity. The concept extends airport Ground Delay Program (GDP) and Flow Constrained Area (FCA) procedures. There are multiple advantages in implementing AFP in addition to traditional GDP as a Severe Weather Avoidance Program (SWAP). AFPs are shown to be more effective at reducing en route airspace congestion than GDPs in support of SWAP. Equivalently, AFPs can achieve a desired airspace demand reduction at lower cost than GDPs in support of SWAP.

During recent years, several systems have been developed for managing air traffic inbound to an airport when both the airport itself and its approach routes are subject to adverse weather. In the context of Collaborative Decision Making (CDM), which is the governing philosophy of the air traffic management system of the United States, many additional capabilities were investigated. These methods systematically manage demand at a constrained en route resource by identifying the flights that are expected to use that resource and holding them on the ground until the airborne capacity to deal with them is available. The dynamic rerouting model provides solutions that can be directly fed to some resource allocation algorithm that assigns routes and release times to individual flights or to the airlines that operate them. When adverse weather blocks or severely limits capacity of terminal approach routes, rerouting flights onto other approaches yields substantial benefits by alleviating high ground delays.

Many flight rerouting systems have been developed to alleviate traffic delays in air traffic flow management associated with severe weather conditions. For example, U.S. Pat. No. 6,606,553 is directed to a method and system for weather problem resolution by automatically deriving a flow of constrained areas from a weather forecast product, generating a candidate flight list including conflict flights predicted to be affected by the flow constraint areas for each conflict flight from the candidate flight list order, generating reroute corridors available, and selecting the best available reroute corridor. Sector workloads are estimated which are affected by rerouting of the conflict flight onto the selected corridor. The corridor is accepted for the conflict flight if sector workloads are below preset limits, or, if the flight would cause the sector workloads to increase beyond the preset workload limits, a check is made for ground delaying the flight, and if found impossible, rejecting the corridor and examining the next available corridor for rerouting the flight.

Other flight control and rerouting systems have also been developed. U.S. Pat. No. 7,248,963 is directed to a method for managing the flow of a plurality of aircraft at an aviation resource, based upon specified data and operational goals pertaining to the aircraft and resource and the control of aircraft arrival fix times at the resource by a system manager. An automated method is provided to manage the flow of a plurality of aircraft into and out of a system or set of system resources.

Although, these known AFP mechanisms all have mechanisms for flight rerouting and schedule management, none of the methods presented in current aviation AFP processes for managing severe weather consider the effect of potential gains in flight management when a coalition of airlines and other flight operators are taken into account. Prior algorithms focus on independent actions of each of the airlines, without regard of exchange opportunities among various airlines. There are great potential benefits for slot-exchange mechanisms in AFPs, in which operators can exchange or compete for CFA arrival slots in an inter-operator time slot exchange marketplace. In contrast to rerouting and rescheduling the flights of a single airline, the dynamic rerouting capability when coalition of airlines are considered results in making rerouting decisions that are better matched to realized weather conditions. Lower total expected delay cost is achieved by evaluating each rerouting decisions for flights considering swapping FCA flight time slots among airlines, and hence exploiting updated information on slot time of participating airlines in the program while making reroute decisions.

Therefore, there is a need to develop a method and system for implementing flight substitution and reroute in a Severe Weather Avoidance Program (SWAP) that includes coalition of participating airlines, which are able to exchange flight time slots in areas of limited capacity. Furthermore, there is a need for methods and systems for traffic flow reroute and flight substitution among multiple airlines to minimize the impact of severe weather on the NAS while avoiding exceeding the available capacity of such sectors. Furthermore, in such a framework, there is a need for evaluating multiple reroute options in order to minimize the impact of severe weather. The system and method should include mechanisms for automatic flight substitution management among multiple airlines and flight operators, as well as an automatic flight rerouting and flight delay management module. In order to determine the best reroute options, there is a need for a method to calculate the benefits and costs for rerouting a flight out of an AFP. Furthermore, in order to automate the cost calculation mechanism there is a need for a method to determine fuel requirements and flight time for the alternative routes. Furthermore, there is a need for an optimization framework which takes the proposed rerouting and flight substitution costs and benefits into account and provides the best flight time and flight reroute options for the airlines in a Severe Weather Avoidance Program.

Therefore, it is clear that an improved air Traffic Flow Management System in an AFP for flight substitution and reroute evaluation is needed. It is an object of the present invention to provide a system and method for traffic flow reroute and flight substitution among multiple airlines to minimize the impact of severe weather on NAS, and provide substantial benefit to the aviation industry.

SUMMARY OF THE INVENTION

It is an object of the present invention to provide a method and system for effective weather rerouting decision support based on frequently updated flow constrained areas, as well as on the basis of a plurality of associated factors in an environment in which a coalition of participating airlines are able to exchange flight time slots.

It is additionally an object of the present invention to provide the system and method for automatic flight substitution management among multiple airlines and flight operators, as well as an automatic flight rerouting and flight delay management module. The proposed traffic flow reroute and flight substitution minimizes the impact of severe weather on the NAS while avoiding exceeding the available capacity of such sectors.

It is a further object of the present invention to provide a method for calculating the benefits and costs for rerouting a flight out of an AFP considering Slot Credit Substitution (SCS) give aways. In order to automate the cost calculation mechanism, we provide a method to determine fuel requirements and flight time for the alternative routes.

It is a still further object of the present invention to provide an optimization framework which takes the proposed rerouting and flight substitution costs and benefits into account and provides the best flight time and flight reroute options for the airlines in a Severe Weather Avoidance Program.

According to the teachings of the present invention, there is provided a method of evaluating flight substitution and reroute for a plurality of flights, wherein each flight is assigned a route, a FCA controlled time of arrival (FCA_CTA) slot, a controlled time of departure (CTD), and a destination controlled time of arrival, wherein the flights are sorted according to the FCA_CTA slot to pass sequentially through an FCA. The method comprises the following steps:
assigning a new route to a first flight;
making available the FCA_CTA slot of the first flight to a subsequent flight to the first flight in the plurality of flights;
assigning a new FCA_CTA slot to each of the subsequent fights according to a method comprising:

a. determining whether the FCA_CTA slot assigned to the subsequent flight can be updated to substitute the FCA_CTA slot made available by a preceding flight to the subsequent flight;
b. if the subsequent flight FCA_CTA slot can be updated to substitute the FCA_CTA slot made available by the preceding flight, then update the subsequent flight FCA_CTA with the FCA_CTA slot made available by the preceding flight;
c. if the subsequent flight FCA_CTA slot cannot be updated to substitute the FCA_CTA slot made available by the preceding flight, then update the subsequent flight FCA_CTA according to a SCS give away method; and
d. making available the subsequent flight FCA_CTA slot to other flights in the plurality of flights;

A re-route benefit is determined by: a. calculating a first metric by subtracting the FCA_CTA of the first flight from the FCA_CTA of a last flight; b. calculating a second metric by subtracting the new destination CTA of the first flight from the destination CTA of the first flight; c. calculating a third metric by adding the SCS give away time of all the flights; and d. subtracting the third metric from the sum of the first and second metric.

Above mentioned SCS give-away method comprises: a. a direct or indirect data exchange between a plurality of airlines; b. swapping the FCA_CTA slots assigned to two flights selected from two different airlines; and c. calculating the SCS give away time as a function of the difference between the two selected FCA_CTA.

BRIEF DESCRIPTION OF THE DRAWINGS

The accompanying drawings, which are incorporated in and form a part of the specification, illustrate embodiments of the present invention and, together with the description, serves to explain the principles of the invention.

DETAILED DESCRIPTION OF THE PREFERRED EMBODIMENTS

Figure 1:
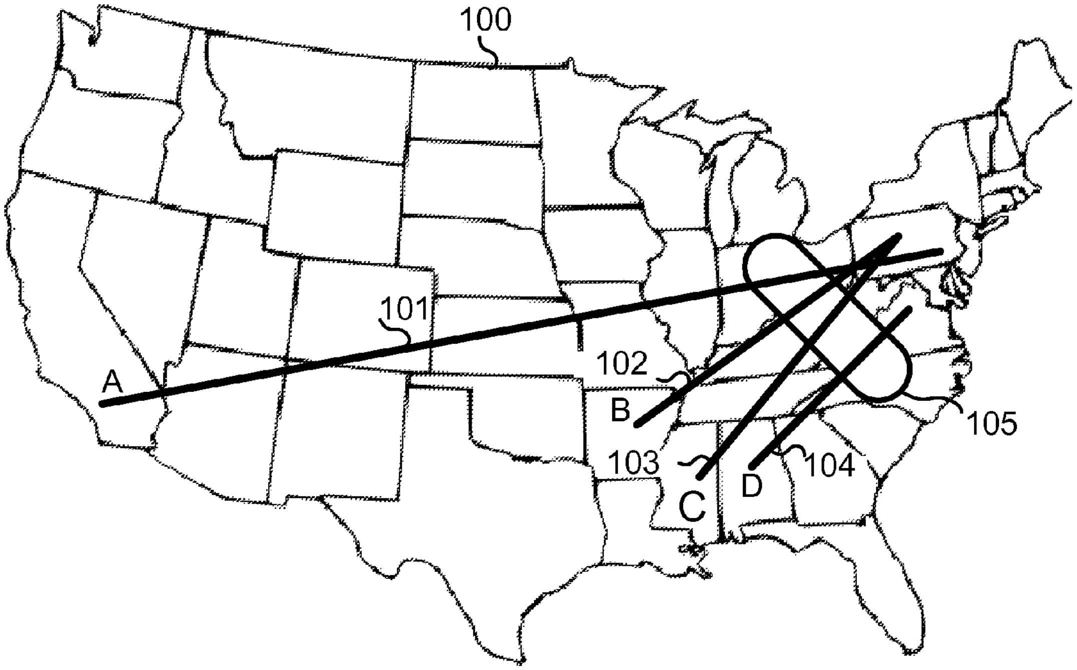
FIG. 1 (Prior Art)
FIG. 1 schematically illustrates a prior art example of a hypothetical FCA and multiple flights passing through the FCA.

These and other objects and features of the present invention will become more apparent from the following detailed description of the present invention considered in connection with the accompanying drawings which disclose an embodiment of the present invention. It should be understood, however, that drawings, as well as the description, are presented here for the purpose of illustration only and not as a definition of the limits of the invention.

The aviation community has long sought better tools and procedures for managing en route congestion on the NAS. The majority of the flight delay events in the United States are due to weather or en route congestion. This shows a continuing need for effective air traffic management (ATM), especially when severe weather reduces the capacity of the NAS. In many circumstances, effective ATM requires a coordinated combination of strategic and tactical traffic management initiatives (TMIs). In situations where demand is below or not much higher than capacity, tactical measures—such as miles-in-trail (MIT), minutes-in-trail, departure spacing, airborne holding, and tactical ground stops—can provide enough local control to safely and efficiently manage traffic.

However, when demand substantially exceeds capacity, which happens most notably when inclement weather reduces capacity below the demands of scheduled traffic, tactical measures are inadequate. In these circumstances, relying on tactical initiatives alone would lead to inequitable and unpredictable impacts, such as long departure delays while waiting for gaps in the overhead traffic flow, and create unsafe conditions, such as excessive airborne holding at constrained resources. On the other hand, the short-term unpredictability of weather and traffic behavior compared with the longer planning horizon needed for strategic TMIs means that tactical measures will continue to be a necessary part of ATM solutions. Thus, in the operational model in which ATM is a combination of strategic and tactical controls, strategic TFM initiatives have a clear role: to bring the demand/capacity imbalance down to a level where local tactical controls are enough to manage any remaining excessive demand.

Historically, a limited number of tools have been available to Federal Aviation Agency (FAA) traffic managers to strategically mitigate excess airspace demand. While localized congestion may be alleviated tactically, it has been shown that restrictions such as MIT usually have a limited effect, as they typically impact very few aircraft. More widespread congestion may be addressed through strategic rerouting of aircraft, including predefined National Playbook routes and Coded Departure Routes (CDR). However, when these methods are insufficient, traffic managers often implement GDPs in support of SWAP.

When severe weather avoidance over an extended region has been the challenge, multiple GDPs have been issued with the goal of reducing overall demand in a constrained region of airspace by holding flights on the ground. This practice is known as issuing GDPs in support of SWAP. GDPs identify aircraft arriving at a particular airport and assign required departure times to these aircraft to achieve a desired arrival rate. GDPs were originally developed to address the need to efficiently meter airport arrival flows during periods of reduced airport arrival capacity (e.g., due to low ceilings, high winds, or convective weather in the terminal area). By delaying inbound flights on the ground, prior to departure, and avoiding the need for airborne holding, TFM objectives can be met at a reduced cost to the customer. Under the CDM program, GDPs have been further refined, incorporating more equitable delay rationing algorithms and eliminating penalties for proactive customer actions such as flight cancellations.

GDP is now implemented as a practical and organized method available to hold flights on the ground when the airspace capacity is limited. When used in support of SWAP, the objective of a GDP is not to alleviate airport capacity/demand imbalances. Rather, the objective is to indirectly mitigate weather-induced en route airspace congestion by delaying flights arriving to major airports on the periphery of the severe weather area.

The specific disadvantages of using GDPs in support of SWAP are inefficiency, ineffectiveness, and inequity. They are inefficient, as much if not most of the delay is applied to flights that are not part of the problem. They are ineffective in that they control only a fraction of the flights in the problem area, so demand isn't properly controlled, and additional measures such as GDPs and Ground Stops (GS) are needed later. They are inequitable, as only flights bound for larger airports are ever affected, and so take a disproportionate share of the delay while other flights are unaffected.

CDM community has recognized these limitations and has sought additional supplementary capabilities. In particular the community has long talked about having a method to systematically manage demand at a constrained en route resource by identifying the flights that are expected to use that resource and holding them on the ground until the airborne capacity to deal with them is available.

To address the limitations of GDPs in support of SWAP, a TFM initiative, the AFP has been developed within the CDM program. AFPs function similarly to GDPs: aircraft are delayed prior to departure to meet TFM objectives, and CDM principles are used to allocate delay equitably. However, AFPs differ from GDPs in that the constrained resource is not an airport but a FCA. AFPs are often used to meter traffic into a specific volume of airspace. The Flow FCA/FEA capability has been added to the Traffic Situation Display (TSD) to identify areas of limited capacity to reduce demand through rerouting flights.

To implement an AFP, traffic managers at the FAA Air Traffic Control System Command Center first define the FCA, which can be any capacity-constrained NAS resource, such as a fix, sector, or arbitrary region of airspace. FIG. 1 illustrates a hypothetical FCA 105 in the northeast of the US map 100. The FCA area 105 is caused due to severe weather conditions impacting traffic flows between the northeast and other parts of the US. Lines 101, 102, 103, and 104 in FIG. 1 show flight tracks A, B, C, and D for aircrafts passing through the FCA 105. Traffic managers can then filter the FCA to only include certain aircraft, as desired; available filters include arrival/departure airports and Air Route Traffic Control Centers (ARTCCs), minimum/maximum altitudes, and aircraft categories (jet, prop, turboprop). Once an FCA is defined, Enhanced Traffic Management System (ETMS) data is used to identify flights planning to transit the FCA. This is the precise function that the AFP is designed to provide. The AFP is an integration of the FEA/FCA flight identification capability with the demand management functions of the Flight Schedule Monitor (FSM). Using the FSM, FCA "arrival" slots are generated at a rate that matches the predicted capacity of the FCA, leaving an appropriate number of slots for predicted "pop-up" traffic (i.e., unknown traffic at the time of AFP implementation).

Figure 2:
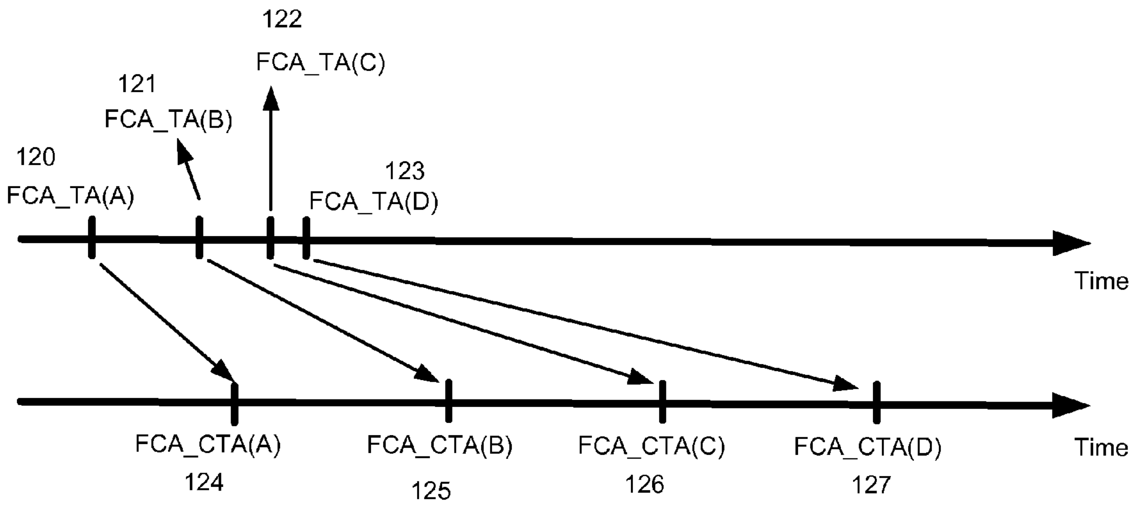
FIG. 2 (Prior Art)
FIG. 2 is a schematic diagram showing a prior art example of an initial schedule for flights A, B, C, and D and the updated FCA schedules.

In the example FCA shown in FIG. 1, flights A, B, C, and D have to be rescheduled to meet the limited capacity requirements of the FCA. FIG. 2. illustrates the initial FCA schedule for flights A, B, C, and D Time of Arrival respectively as FCA_TA(A) 120, FCA_TA(B) 121, FCA_TA(C) 122, and FCA_TA(D) 123. FCA Controlled Time of Arrival (FCA_CTA) slots FCA_CTA(A) 124, FCA_CTA(B) 125, FCA_CTA(C) 126, and FCA_CTA(D) 127 are generated at a rate that matches the predicted capacity of the FCA 105 and are assigned to flights A, B, C, and D respectively. FCA_CTA arrival slots are then used to calculate the flight departure times depending on the aircraft type, flight track, and departure airports.

The AFP tools can potentially be applied to a wide range of capacity/demand balancing problems but the primary motivation for proceeding with the deployment of AFPs at this time is to develop an alternative to GDPs in support of SWAP. Much like an airport GDP, the arrival slots are then translated to departure clearance times. As with GDPs, customers are given a degree of flexibility within the AFP constraints to adjust operations according to their business objectives (e.g., slot substitutions for high-priority flights). In addition, customers have the option to reroute around AFPs, trading ground delay for airborne delay.

Figure 3:
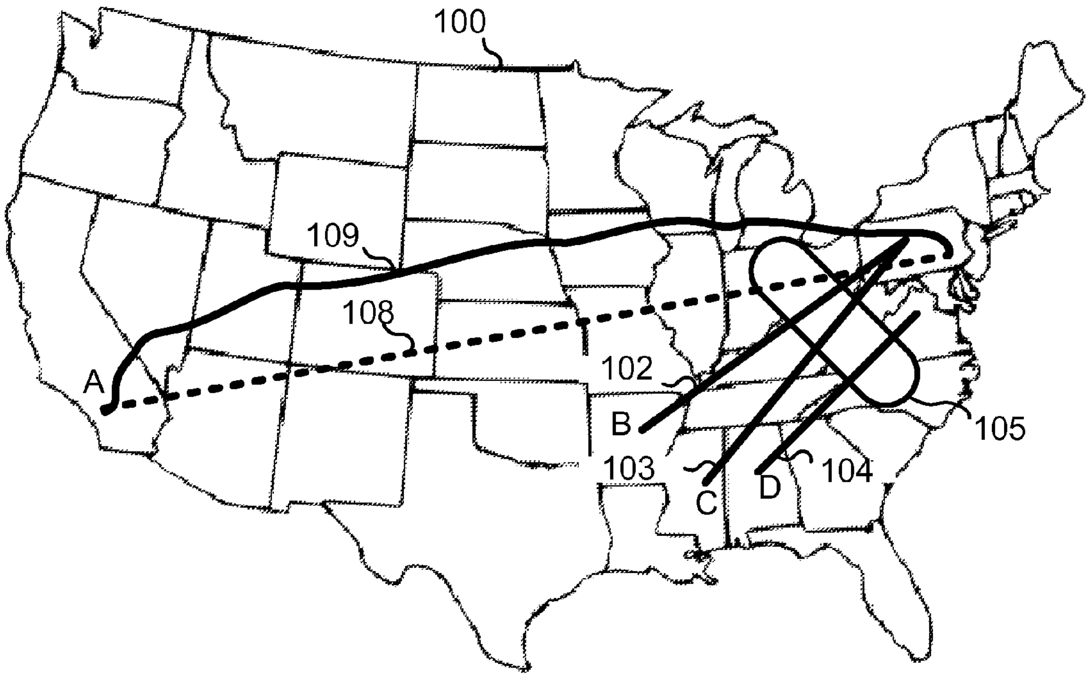
FIG. 3 (Prior Art)
FIG. 3 schematically illustrates a prior art example of a hypothetical FCA and a flight that is rerouted not to traverse the FCA.
Figure 4:
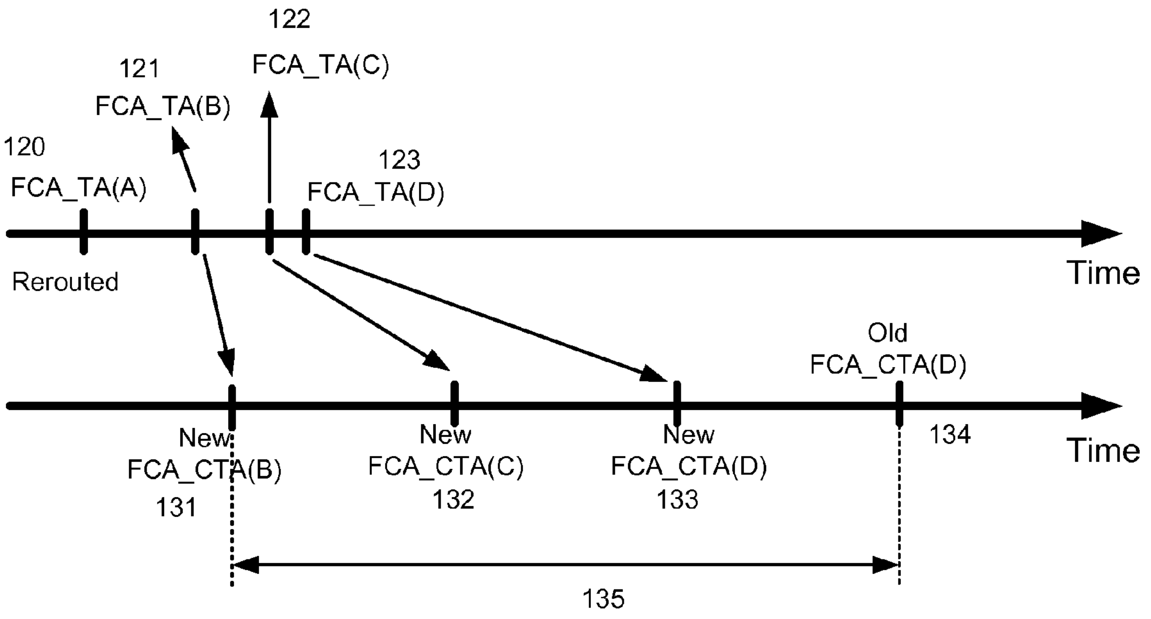
FIG. 4 is a schematic diagram showing an example initial schedule for flights A, B, C, and D and the updated new FCA schedules when flight A is rerouted.

FIG. 3 schematically illustrates the hypothetical FCA 105 in which flight A is rerouted through track 109 instead of track 108 not to traverse the FCA 105. Flight A is now trading ground delay for airborne delay. Other flights now can be substituted into the slot freed by the route-out flights. FIG. 4 is a schematic diagram showing the initial schedule for flights A, B, C, and D and the updated FCA schedules when flight A is rerouted. As shown in FIG. 4 Flight A is no longer assigned an FCA_CTA, and instead flight B, C, and D can be assigned to earlier FCA Controlled Time of Arrivals: New FCA_CTA (B) 131, New FCA_CTA(C) 132, and New FCA_CTA(D) 133. The first benefit of routing flight A out of the FCA is that the delay on the flight A lifted. The second benefit is that the delay for flights B, C, and D is reduced. The overall reduction in delay due to flight substitution is equal to Old FCA_CTA (D) 134 minus New FCA_CTA(B) 131. There are costs associated to routing flight A out of an AFP. The re-route cost is a function of the difference between flight distances, flight air times, and flight fuel costs of the original route and the new route out of flight A. A method for calculating benefits and costs for each re-route option is presented for more generic and complicated scenarios in this disclosure.

AFPs were operationally deployed in the NAS in June, 2006. Prior to this, the AFP concept was evaluated using extensive simulation studies and human-in-the-loop (HITL) exercises. Although there are many possible uses for the AFP capability, the application that motivated its deployment, and for which AFPs have been initially used, is as an alternative to GDPs in support of SWAP.

The responsibility for resolving operational details and identifying a feasible path to deployment for the AFP concept was given to the Flow Evaluation Team (FET), a subgroup in CDM combining the functions of the Integrated Route Team (IRT) and FCA/Reroute workgroups. This group has been working since spring of 2005 to define the system functional requirements to support AFPs as well as to design the Concept of Operations (ConOps), procedures, training, and other related issues. The AFP ConOps provides the FAA and the customers with a framework for the use of AFPs as an effective tool to strategically decrease the level of traffic through an identified area of airspace to a level manageable by the Traffic Management Specialists.

There are many steps in operational implementation of an AFP. When convective weather forecasts suggest there will be major impact on traffic, Air Traffic Control System Command Center (ATCSCC) Traffic Management Specialists, in consultation with the field Traffic Management Coordinators and customers, will consider a set of predefined FCAs from a list in the TSD. Then, the FCA most appropriate for the expected weather and traffic situation will be selected.

Once this predefined FCA has been activated in the TSD, specialists at the ATCSCC can designate the FCA as "FSM-eligible." For any FCA that is designated FSM-eligible, ETMS will generate and distribute regularly updated Aggregate Demand Lists (ADLs), detailed information on all flights expected to be in the FCA for the next several hours.

All active FSM-eligible FCAs will appear in a list in FSM. Selecting an FCA in FSM will bring up all the tools and displays familiar to FSM users, but here populated with the demand at the FCA rather than at an airport.

The FSM bar chart will show the aggregate demand for each selected time period. When the demand in the FEA/FCA is projected to substantially exceed capacity, the Traffic Management Specialists at the ATCSCC, again after consultation with the TFM team, can issue an AFP for the FCA. This is analogous to issuing a GDP for an airport. The primary steps in the process are a. The specialists will specify a program rate (flights per hour), the duration of the program, and any appropriate flight exemptions (it is expected that few if any flights will be exempted for AFPs),
b. FSM will generate a list of entry times, or slots, consistent with the specified rate,
c. These slots will be allocated to flights expected to enter the FCA in a manner consistent with the philosophy of Ration by Schedule (RBS),
d. For each affected flight, the estimated time from departure to entry into the FCA will be computed based on the current flight plan,
e. This transit time will be subtracted from the slot time to produce an Estimate Departure Clearance Time (EDCT) for the flight.
f. The EDCTs for each flight will then be sent to the centers and towers for action, to the operators of the flights for their schedule management, and to ETMS to maintain a consistent tactical picture.

Customers with flights controlled by an AFP will typically have the option to route out of the FCA, away from the congested area. In return the flight will have its EDCT lifted, and be allowed to depart on time. Flights that file or route into an AFP will be treated as popups, similar to popups in a GDP. They will be assigned a Fuel Advisory (FA) delay, which is the average delay received by other flights intending to enter the FCA at the same time as the popup, and will be issued an EDCT.

If a large number of flights drop out of the demand, through cancellations or rerouting, then the specialists can execute a compression through FSM. In a compression, EDCTs for flights are moved earlier to compact the demand and reduce delay. If the demand again substantially exceeds the capacity from many new flights entering the FCA or if the weather constraint worsens, then the specialists can revise the program through FSM. In a revision EDCTs for flights are regenerated and reissued to return demand to the expected capacity. When the weather abates and the controls are no longer needed then the program can be canceled, and all EDCTs for the program will be lifted.

Figure 5:
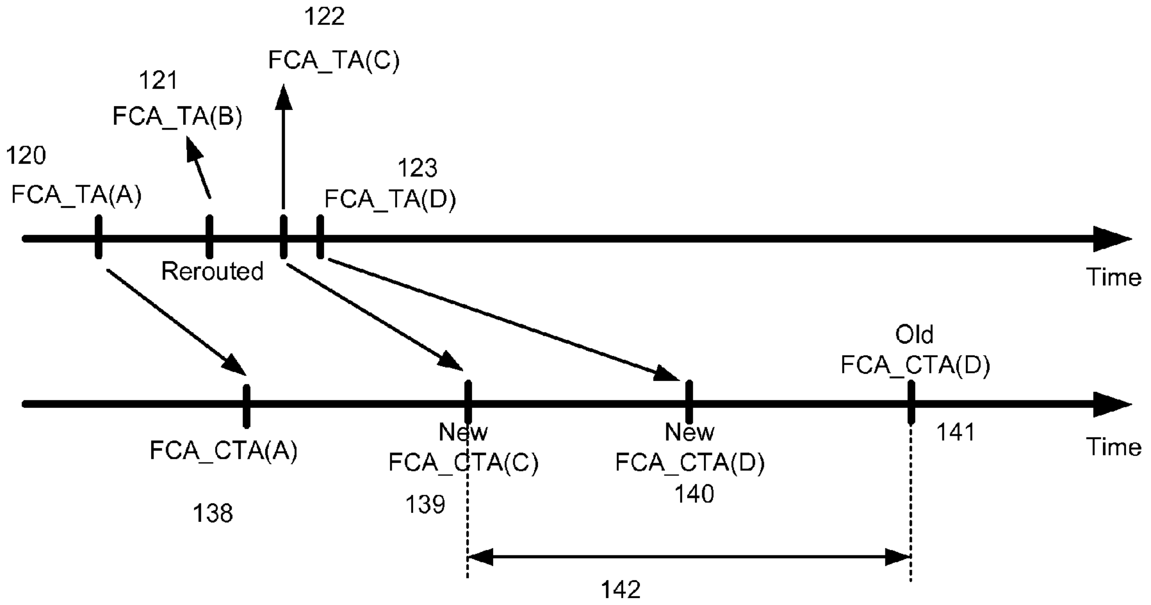
FIG. 5 is a schematic diagram showing an example initial schedule for flights A, B, C, and D and the updated new FCA schedules when flight B is rerouted.

There are multiple re-route options in an AFP in the example FCA shown in FIG. 1, and any one or plurality of the fights A, B, C, or D can be rerouted to free up their corresponding FCA slots. For example, flight B can be re-routed trade ground delay for airborne delay and not to traverse the FCA 105. Other flights now can be substituted into the slot freed by the route-out flight B. FIG. 5 illustrates the initial FCA schedule for flights A, B, C, and D Time of Arrival respectively as FCA_TA(A) 120, FCA_TA(B) 121, FCA_TA (C) 122, and FCA_TA(D) 123. FIG. 5 also shows the updated FCA schedules when flight B is rerouted. Flight B is no longer assigned an FCA_CTA and its slot is available to other flights. Instead, flights C and D can be assigned to earlier FCA CTAs: New FCA_CTA(C) 139, and New FCA_CTA(C) 140. The FCA_CTA(A) 138 will not change, since flight B was schedule to traverse the FCA after flight A. The first benefit of routing flight B out of the FCA is that the delay on the flight B is lifted. The second benefit is that the delay for flights C, and D is reduced. The overall reduction in delay due to flight substitution is equal to Old FCA_CTA(D) 141 minus New FCA_CTA(C) 139. There are costs associated to routing flight B out of an AFP. The re-route cost is a function of the difference between flight distances, flight air times, and flight fuel costs of the original route and the new route out of flight B. The overall cost and benefits of re-routing flight A and B (as shown in FIG. 4 and FIG. 5) can be analyzed and compared in order to select the best reroute option for the flight operator.

As described in the preceding example, benefits of routing a flight out of an AFP come from two directions. First, the delay on the flight routing out is lifted, assuming it is not routing into another AFP. Second, other flights can be substituted into the slot freed by the route-out flight and reach the destination earlier. There are costs associated to routing a flight out of an AFP. The re-route cost is a function of the difference between flight distances, flight air times, and flight fuel costs of the original route and the new route out option. The method to calculate the benefits and costs of each re-route options is an object of this invention and is presented in this disclosure.

Figure 6:
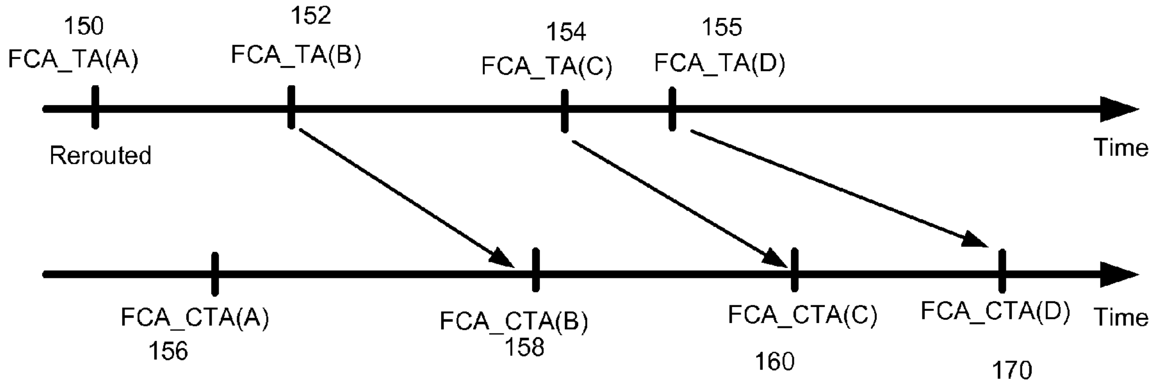
FIG. 6 is a schematic diagram showing a different example for initial schedule for flights A, B, C, and D and the updated FCA schedules when flight A is rerouted.

Before discussing the methods and systems presented in this invention, a flight schedule and route out is presented, in which flight time slot substitution is not readily possible when a flight is re-routed. FIG. 6 is a schematic diagram showing a different example for initial schedule for flights A, B, C, and D and the updated FCA schedules when flight A is rerouted. Flight A is trading ground delay for airborne delay. Unfortunately, other flights now are not able to utilize the slot freed by the route-out flight A. FIG. 6. illustrates the initial FCA schedule for flights A, B, C, and D Time of Arrival respectively as FCA_TA(A) 150, FCA_TA(B) 152, FCA_TA(C) 154, and FCA_TA(D) 155. FCA_TA(B) 152 is scheduled later than FCA_CTA(A) 156, and therefore flight B is not able to substitute the time slot freed by re-routed flight A. Flight B, C and D will be assigned the FCA Controlled Time of Arrival (FCA_CTA) slots FCA_CTA(B) 158, FCA_CTA(C) 160, and FCA_CTA(D) 170, and will not benefit from re-routing flight A.

Such a scenario, in which slot substitution is not feasible, may happen quite often when a flight is re-routed not to traverse an FCA. Specially, when the number of an airline flights going through an FCA is not relatively high.

One important difference is in the distribution of FCA slot ownership among the operators. If a single carrier has a substantial presence traversing an FCA, it will typically have a fairly regular distribution of slots through the time frame of the program as a natural result of the initial allocation. This would mean that if the carrier needs a slot near a given time, it probably has one. But when a carrier does not have a strong presence at an FCA, there will be limited options for re-routing. The carriers will not be able to gain high potential benefits from re-routing flights. The proposed invention will allow airlines to swap slots and enable slot substitution which reduces overall flight delays.

The proposed system using slot credit substitution in an AFP leads to a more equitable and efficient application of delays necessary to control air traffic congestion, thereby minimizing disruptions to the movement of passengers and goods and reducing airline costs. It is an object of the present invention to enhance AFP efficiency by developing a method and system for implementing flight substitution and reroute in a SWAP that includes coalition of participating airlines, which are able to exchange flight time slots in areas of limited capacity. The invented traffic method and system for flow reroute and flight substitution among multiple airlines minimizes the impact of severe weather on the NAS while avoiding exceeding the available capacity of such sectors. A framework is proposed to evaluate multiple reroute options in order to minimize the impact of severe weather. The system and method includes mechanisms for automatic flight substitution management among multiple airlines and flight operators, as well as an automatic flight rerouting and flight delay management module. In order to determine the best reroute options, a method is invented for calculating the benefits and costs for rerouting a flight out of an AFP.

Market Mechanisms for Flight Substitution and Reroute

Figure 7:
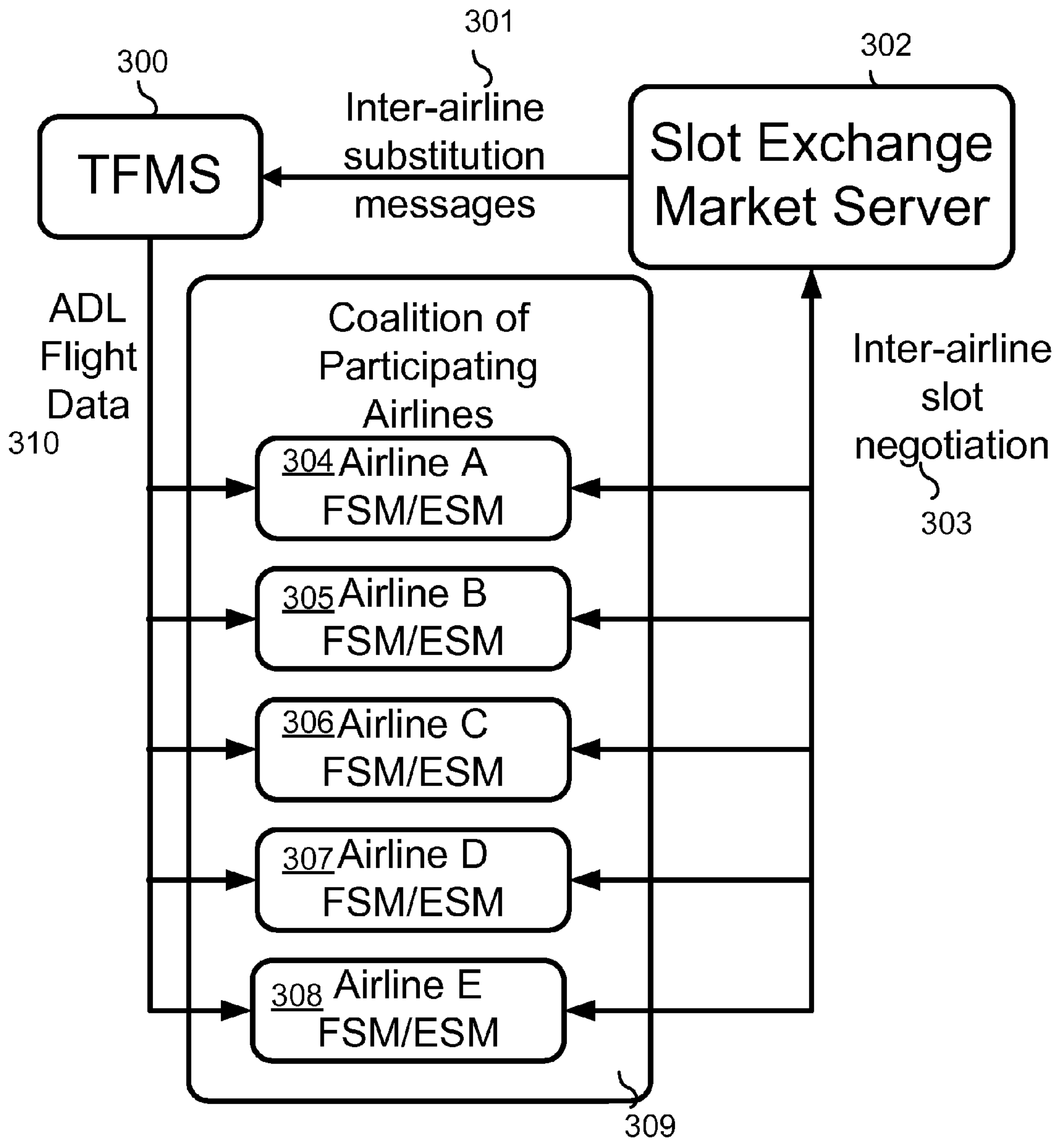
FIG. 7 is a block diagram of an aspect of the present invention showing Traffic Flow Management System interfacing a Slot Exchange Market Server.

FIG. 7 is a block diagram of an aspect of the present invention showing TFMS 300 interfacing a Slot Exchange Market Server 302. Inter-airline substitution messages 301 are exchanged between airlines through TFMS after slot exchange is confirmed by Slot Exchange Market Server 302. In order to achieve the objective of this invention, a system is developed to support a marketplace in which coalition of participating airlines 309 can exchange arrival slots in TFM initiatives such as AFPs and GDPs. Inter-airline slot negotiation 303 takes place among participating airlines 309 when coalition of participating airlines interface with Slot Exchange Market Server 302. A central server connects to the FSM/Enhanced Substitution Module (ESM) software at each of the coalition participating airlines 304, 305, 306, 307, and 308, and then matches and communicates exchange opportunities, accepts exchange approvals from the partners, and executes the exchanges by sending substitution messages to the FAA TFMS. Updated Airborne Data Loader (ADL) Flight Data is then communicated to participating airlines 304, 305, 306, 307, and 308.

Both FAA and NASA research has highlighted the need for efficient and equitable allocation of NAS resources and increased operational flexibility. In the past, market-based mechanisms have been suggested for transferring system-imposed delay from more critical to less critical flights. No such capability is available to NAS users today.

The advent of AFPs in 2006 has generated many more potentially exchangeable resources that would be valued sufficiently differently by their owners to make a trade desirable. NAS users and the FAA would benefit from such a marketplace and it would enable users to collectively reduce their operating costs resulting from NAS congestion. It also changes the forces at work in a slot-trading marketplace, making it much more valuable to flight operators. Such a system provides the aviation community with tool for reducing operating costs by trading scarce NAS resources. The system proposed in this invention involves:

- A coalition of airlines and other flight operators that want to participate in the inter-operator slot market.
- Modifications to the existing intra-airline slot substitution software, ESM system, which will identify beneficial inter-operator slot exchanges, and provide an interface allowing flight operators to review and approve such exchanges, and communicate with a central server that will coordinate and execute these exchanges.

During conditions in which demand for NAS resources exceeds capacity, the FAA applies TFM techniques to mitigate the imbalance. The goal is to move planes as efficiently as possible without overburdening an airport or region of airspace. An effective tool for managing demand is through imposed ground delays, applied by AFPs for airspace. When imposing these delays, the FAA uses accepted first-come-first-serve rules (ration by schedule) to allocate available resources to flight operators in the form of FCA arrival slots at the constrained resource at designated times. Recognizing that each flight may have a different value and different constraints for the operator, the FAA provides a mechanism for each operator to shuffle its flights among its allocated arrival slots.

Experience in operations, however, has shown that the set of arrival slots allocated to a carrier may not be the set that the carrier needs to meet its business objectives. A mechanism to facilitate arms-length inter-operator slot exchange was introduced in the SCS capability, which lets operators make slot exchanges beneficial to each, as expressed through a set of preference rules. However, this slight increase in flexibility is not enough to provide the level of efficiency improvement that NAS users will need moving into the future.

The proposed framework provides a safer TFMS and a higher capacity airspace system. In particular, it can be implemented in the concept development for the Next Generation Air Transportation System (NextGen). Under NextGen, alleviation of congestion at the strategic level and maintenance of aircraft separation standards at the tactical level together ensure safety. Efficient allocation of resources to NAS users is far more difficult and requires mechanisms by which users can express and act upon the utility of NAS resources for their operations. The proposed system provides the aviation industry with a market-based resource exchange concept for inclusion in the design of NextGen. To fully appreciate the relevance of this invention, two things must be understood:

a. There will continue to be competition for NAS resources. Though NextGen will be designed to accommodate anticipated growth in capacity, past experience has shown that demand grows to meet the capacity. Any uneven distribution of demand (in space or time) or temporary loss of capacity will create competition for resources.
b. A major lesson learned from CDM is that efficiency should be measured relative to the standards and values of the NAS users, rather than by using generic efficiency metrics such as throughput, which tend to treat all flights as interchangeable. Air carriers have a strong desire to maintain the integrity of their published schedules, as this provides the best possible service to their passengers.

There are great potential benefits for a slot-trading market in AFPs. One important aspect in this framework is in the distribution of slot ownership among the operators. If a single carrier has a substantial presence at an FCA, it will typically have a fairly regular distribution of slots through the time frame of the program as a natural result of the initial allocation. This would mean that if the carrier needs a slot near a given time, it probably has one already and does not need to go to a market to secure it.

The smaller players may at times have a great need for some of the slots the dominant carriers own, but without a mutual complementary need among actors, there may not be much trade activity. In an AFP, no carrier has a strong presence and the majority of the demand comes from carriers that each controls a fraction of the time slots. It is among these carriers that we would expect to see differential values for arrival slots, hence providing the need for a market.

AFPs are distinguished from GDPs by another characteristic that increases the potential value of a slot substitution among flight operators. In a GDP, each flight has two basic options—it can accept its assigned delay or it can cancel. While the cost of delay or cancellation differs among aircraft and operators, the costs are on a similar scale. AFPs, on the other hand, provide an additional option: flights can route out of the AFP and free up a marketable slot. The feasibility of a flight routing out, however, depends very much on the AFP and the flight's city pair. Many flights with slots in an AFP can be easily routed out at low cost to the operator, and other flights that would double their path length or more to avoid the AFP constraints. For instance, the flight from Miami to Boston can route out of an FCA in the northeast at almost no cost, and trade the freed AFP slot to, for example, the operator of the Raleigh-Durham to Pittsburgh flight for better access to a GDP at a later time. This contrast leads to very different valuations of the slots to operators, which leads to the need for a market and an evaluation mechanism for flight substitution and re-route which are addressed in this invention.

Some inroads have been made under the highly successful FAA-industry program known as CDM. CDM has implemented airport arrival slot trading through various means:

a. Airline Slot Substitution procedures (intra-carrier only)
b. Compression algorithm (intra-carrier and inter-carrier slot trading)
c. Slot Credit Substitution (intra-carrier and inter-carrier slot trading)
d. Adaptive compressions (passive intra-carrier and inter-carrier slot trading)

Under this framework, carriers would be allowed to manage delay credit accounts held with the FAA or other organizations over extended periods to maximize effectiveness of their operations. The proposed system will lead to a more equitable and efficient application of delays necessary to control air traffic congestion, thereby minimizing disruptions to the movement of passengers and goods and reducing airline costs. The benefits are the development of the infrastructure necessary to promote and support the delay management concepts and the mechanisms by which NAS users can input prioritization preferences.

Method and System for Flight Substitution and Reroute

There are multiple re-route options in an AFP in the example FCA shown in FIG. 6, and any one or plurality of the fights A, B, C, or D can be rerouted to free up their corresponding FCA slots. It is an object of the present invention to enhance AFP efficiency by developing a method and system for implementing flight substitution and reroute in a SWAP that includes coalition of participating airlines, which are able to exchange flight time slots in areas of limited capacity. A framework is proposed to evaluate multiple reroute options in order to minimize the impact of severe weather. The system and method includes mechanisms for automatic flight substitution management among multiple airlines and flight operators, as well as an automatic flight rerouting and flight delay management module. We first present the preferred flight substitution and reroute method, and then present the preferred method for calculating the benefits and costs for rerouting each flight out of an FCA.

Figure 8:
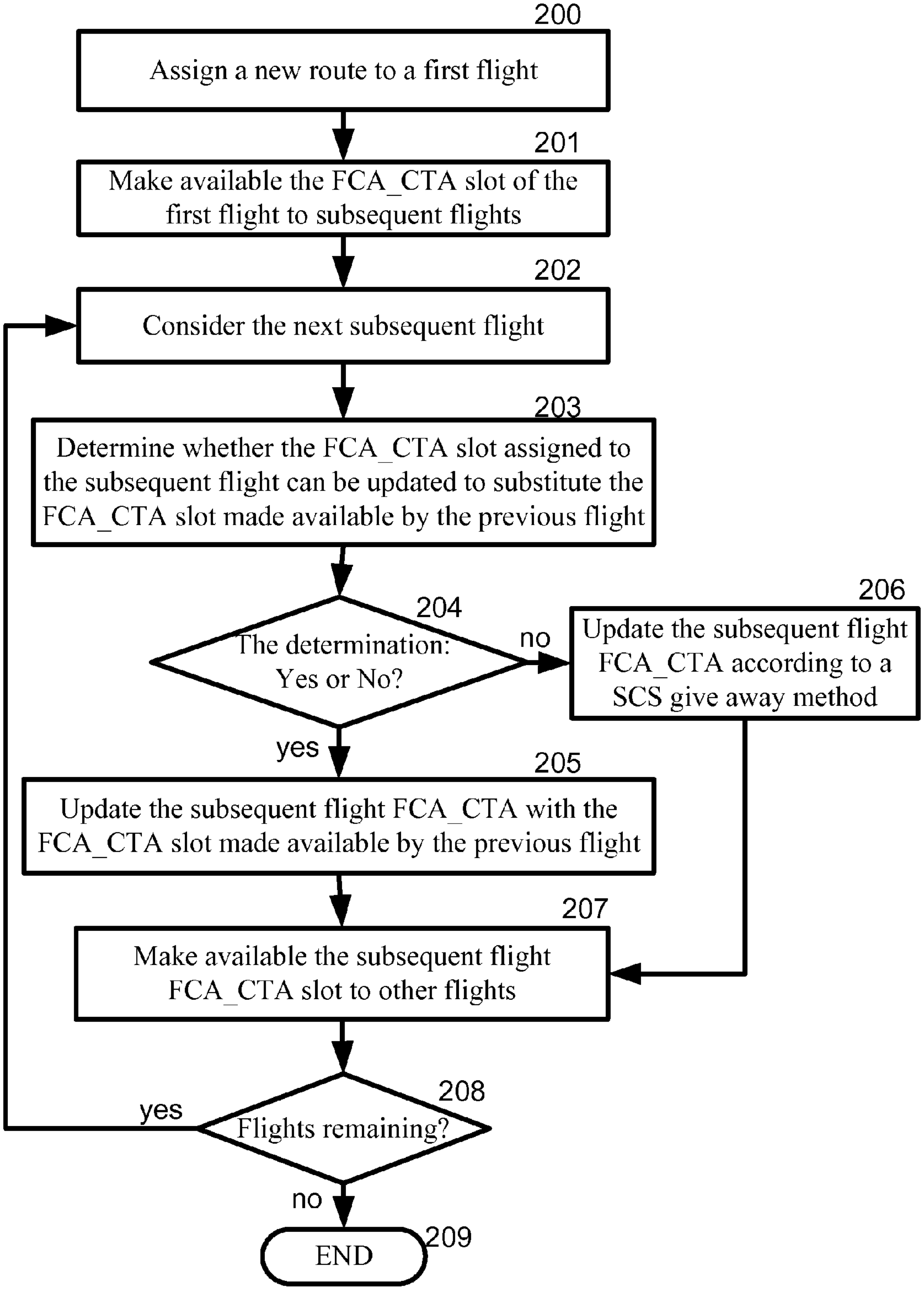
FIG. 8 presents a depiction of the preferred method for the present invention for flight substitution and reroute.
Figure 9:
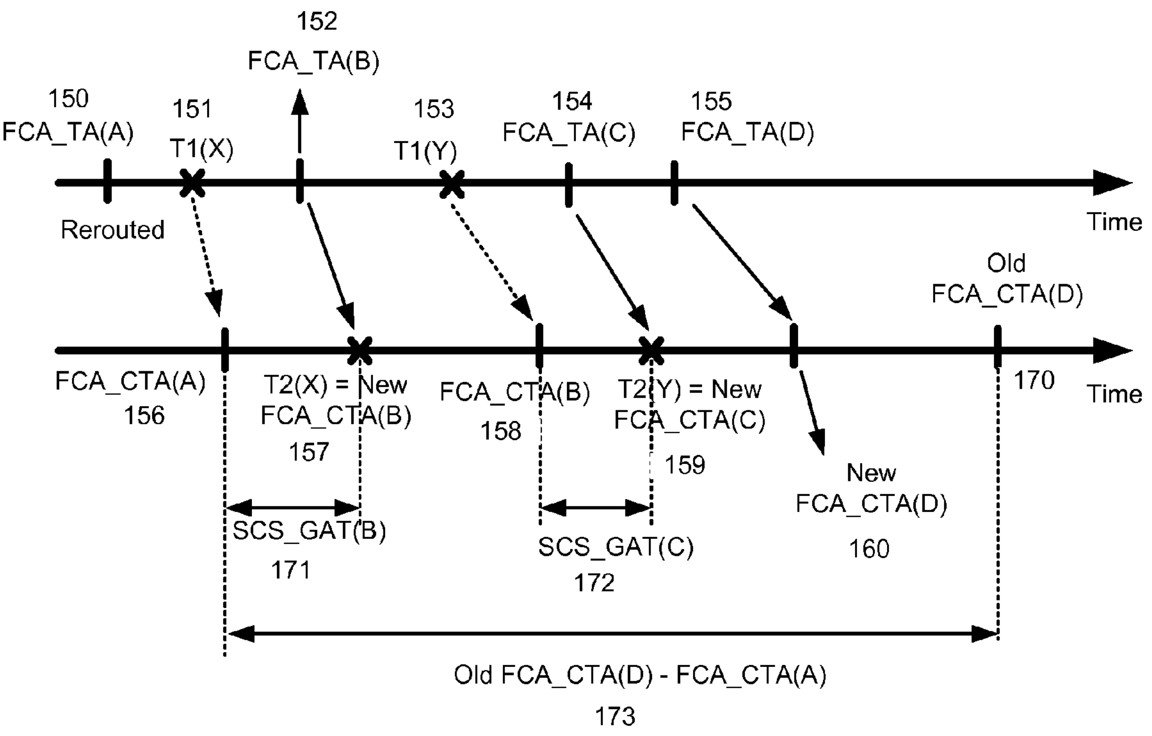
FIG. 9 is a schematic diagram showing an example initial schedule for flights A, B, C, and D and the updated FCA schedules when slot substitution method is implemented.

FIG. 8 presents a depiction of an embodiment of the preferred method for the present invention for flight substitution and reroute. In step 200, this method is seen to assign a new route to a first flight. The subsequent steps in the method determine how the first flight route change would yield an overall flight schedule solution where a safer, more efficient sequence of arrival times can be found. FIG. 9 is a schematic diagram showing an example initial schedule for flights A, B, C, and D and the updated FCA schedules when implementing slot substitution method depicted in FIG. 8. The plurality of the flights that are used as input to this algorithm could be any subset of flights A, B, C, and D. For example, only flights A, B, and D could be considered for flight substitution and reroute algorithm. In the example shown in FIG. 9, we consider four flights A, B, C, and D as input to the method presented in FIG. 8. FIG. 9 illustrates the initial FCA schedule for flights A, B, C, and D Time of Arrival respectively as FCA_TA(A) 150, FCA_TA(B) 152, FCA_TA(C) 154, and FCA_TA(D) 155. When severe whether in FCA area is detected, FCA_CTA slots 156, 158, 160, and 170 are assigned to the airline based on the limited capacity available in the FCA.

In one embodiment of the present invention, as illustrated in FIG. 9, flight A is rerouted and is no longer assigned an FCA_CTA. As indicated in step 201 in FIG. 8 its FCA time slot is made available to subsequent flights. In this example, the subsequent flight is flight B. In step 203, this method determines whether the FCA_CTA slot assigned to flight B can be updated to substitute the FCA_CTA slot made available by rerouting flight A. In the example shown in FIG. 9, FCA_TA(B) 152 is scheduled later than FCA_CTA(A) 156, and therefore flight B is not able to substitute the FCA time slot freed by re-routed flight A. In step 204, the answer to the determination check would be "No" for this example. Then, the operator executes step 206, in which it updates subsequent flight FCA_CTA (for flight B in the example) according to Slot Credit Substitution (SCS) give away method.

In the SCS give away method, the operator considers exchanging its available FCA time slot with another operators' available FCA time slot in a slot exchange market. There are various methods to exchange slots among operators. One preferred embodiment would be the system introduced in FIG. 7, in which inter-airline slot negotiation takes place among participating airlines when coalition of participating airlines interface with Slot Exchange Market Server. In the example shown in FIG. 9, FCA_CTA(A) 156 is exchanged with the available slot of flight X, T2(X) 157. Flight X may belong to another operator. The flight X then will be scheduled to traverse the FCA at the time slot previously assigned to flight A, FCA_CTA(A) 156. Flight B then would be able to traverse the FCA at time T2(X)=New FCA_CTA(B) 157, which is an earlier time slot compared with its original FCA assignment FCA_CTA(B) 158. The SCS give away method proposed in step 206 would benefit both flights B and X and both flights are schedule to traverse the FCA earlier than their original schedule.

In step 207, the method makes available the subsequent flight FCA_CTA slot to other flights. In the example of FIG. 8, FCA_CTA(B) is now available for subsequent flights, since its flight is re-scheduled to earlier time, T2(X) 157. In step 208, this method verifies whether there is any remaining flight traversing the FCA. If the step determines that there are more flights traversing the FCA, then it will re-start the method from step 202. If there is not other flight traversing the FCA, then the algorithm terminates. FIG. 9 shows an example initial schedule for flights A, B, C, and D and the updated FCA schedules when implementing slot substitution method. SCS give away step 206 is executed for flights B and C, and both flights benefited by exchanging slots with other carriers and being scheduled at earlier slots.

The flight substitution and reroute method of FIG. 8 can be summarized as a method of flight substitution and reroute for a plurality of flights, wherein each flight is assigned a route, a FCA controlled time of arrival (FCA_CTA) slot, a controlled time of departure (CTD), and a destination controlled time of arrival, wherein the flights are sorted according to the FCA_CTA slot to pass sequentially through an FCA. The method comprises the following steps:

assigning a new route to a first flight;

making the FCA_CTA slot of the first flight available for assignment to a subsequent flight to the first flight in the plurality of flights;

assigning a new FCA_CTA slot to each of the subsequent fights according to a method comprising:

a. determining whether the FCA_CTA slot assigned to the subsequent flight can be updated to substitute the FCA_CTA slot made available by a preceding flight to the subsequent flight;
b. if the subsequent flight FCA_CTA slot can be updated to substitute the FCA_CTA slot made available by the preceding flight, then update the subsequent flight FCA_CTA with the FCA_CTA slot made available by the preceding flight;
c. if the subsequent flight FCA_CTA slot cannot be updated to substitute the FCA_CTA slot made available by the preceding flight, then update the subsequent flight FCA_CTA according to a SCS give away method; and
d. making available the subsequent flight FCA_CTA slot to other flights in the plurality of flights;

The steps above are executed for all the flights until all the flights are examined for rescheduling.

The SCS give-away method comprises: a. a direct or indirect data exchange between a plurality of airlines; b. swapping the FCA_CTA slots assigned to two flights selected from two different airlines; and c. calculating the SCS give away time as a function of the difference between the two selected FCA_CTA. In example of FIG. 9, SCS give away time for rescheduling flight B, SCS_GAT(B) 171 is equal to New FCA_CTA(B) 158 minus FCA_CTA(A). And SCS give away time for rescheduling flight C, SCS_GAT(C) 159 is equal to New FCA_CTA(C) 159 minus FCA_CTA(B) 158.

There are multiple re-route options in an AFP in the example FCA shown in FIG. 9, and any one or plurality of the fights A, B, C, or D can be rerouted to free up their corresponding FCA slots. Therefore, a method is needed to evaluate multiple reroute options in order to minimize the impact of severe weather and select the best re-route options available. In order to determine the best reroute options, a method is invented for calculating the benefits and costs for rerouting a flight out of an AFP considering SCS give away method using slot substitution among airlines.

Benefits of routing a flight out of an AFP come from two directions. First, the delay on the flight routing out is lifted, assuming it is not routing into another AFP. Second, other flights can be substituted into the slot freed by the route-out flight and reach the destination earlier. There are costs associated to routing a flight out of an AFP. The re-route cost is a function of the difference between flight distances, flight air times, and flight fuel costs of the original route and the new route out option. The method to calculate the benefits and costs of each re-route options is also an object of this invention and is presented in this disclosure.

Benefits of routing a flight out of an AFP come from two directions:

a. The delay on the flight routing out is lifted, assuming it is not routing into another AFP. The benefit from this in minutes saved is equal to the flight's current CTA minus the earliest arrival time, which is a function of the departure time announced to the customers, the current time, the ETE, and the minimum notification time
b. Other flights can be substituted into the slot freed by the route-out flight. An upper bound to this is the CTA of the last flight in the program minus the CTA of the route-out flight. For sparse scheduling within the AFP or low delay levels this will be reduced by SCS give-aways.

To be more specific: Let $CTD_A$, $CTA_A$, $CTD_D$ and $CTA_D$ be the current controlled arrival and departure times for the potential route-out flight A and the last non-cancelled flight in the AFP, D. Let $EARTA_A$ be the earliest achievable arrival time of the potential route-out flight. Then the maximum potential benefit for a route-out flight will be $CTA_D$ minus $EARTA_A$.

Define $MB_A$ as this upper limit of potential benefit for routing A out of the AFP. Define $RB_A$ as the realizable benefit of routing A out. Define $LB_A$ as the lost benefits from routing A out, $MB_A$ minus $RB_A$ $LB_A$ will be non-zero if the compression between $CTA_A$ and $CTA_D$ cannot be completed with the customer's own flights, and the size of $LB_A$ will be the amount of SCS loss over the $CTA_A$ to $CTA_D$ interval. $LB_A$ will therefore be a non-increasing function of a flight's slot time—flights in later slots will never have more lost benefits than flights in earlier slots. This fact will make it easier to compute the $RB_A$ for each flight as the slot assignments change.

All of the information needed to compute the benefits of a specific route out are available to ESM/FLO already through the ADL, assuming the customer is keeping its CDM data current.

In summary, the re-route benefit can be calculated as a function of at least one of the following: i. the FCA_CTA of the first flight; ii. the FCA_CTA of a last flight, the last flight having latest FCA_CTA slot among all flights in the plurality of flights; iii. difference between the new destination CTA and the destination CTA of the first flight; and iv. SCS give away time assigned to all the subsequent flights.

To be more specific the re-route benefit is determined by: a. calculating a first metric by subtracting the FCA_CTA of the first flight from the FCA_CTA of a last flight; b. calculating a second metric by subtracting the new destination CTA of the first flight from the destination CTA of the first flight; c. calculating a third metric by adding the SCS give away time of all the flights; and d. subtracting the third metric from the sum of the first and second metric. In the example of FIG. 9, the first metric is equal to Old FCA_CTA(D) 170 minus FCA_CTA(A) 156, as shown by number 173 in the figure. The second metric is equal to the destination CTA minus the new destination CTA, which is not shown in the figure. The third metric is equal to SCS_GTA(B) 171 plus SCS_GTA(C) 172. Overall the benefit for the example of FIG. 9 can be expresses as:

$$\text{Overall Benefit}=[\text{FCA\_CTA}(D)-\text{FCA\_CTA}(A)]+[\text{the destination CTA minus the new destination CTA}]-[\text{SCS\_GTA}(B)+\text{SCS\_GTA}(C)]$$

Now we present the preferred method for calculating costs for rerouting each flight out of an FCA. To make an absolute comparison between the costs and the benefits they will each have to be put into a common unit. The benefits units come in the form of delay minutes, which can be roughly converted to dollars by multiplying. Some method of converting flight time or fuel burn to dollars will have to be established.

The primary cost of a route-out is increased flight distance or air time. This is the difference between the cost of the currently planned route and the cost of the route not traversing through the AFP. ESM/FLO has neither the information nor the tools to compute either of these costs. The primary question for the capability to evaluate and recommend route-put strategies is whether we can practically and adequately compute the difference in these two costs. Three possible paths to this information have been suggested:

1) The customer uses its flight planning tools to compute the cost of a flight's current flight plan and the cost of the alternative and provides these costs or their difference to ESM/FLO through an automated communication channel. Alternatively this cost difference could be typed in for a flight manually through the ESM/FLO interface.

2) ESM/FLO determines the least cost path around the AFP. This would require a description of the AFP, an ROG-like capability and database to find flight plans around the AFP, some sort of trajectory prediction model to compute the fuel burn/flight time of the alternative, and the fuel burn/flight time of the current flight plan. In the case that flight time is an adequate proxy for cost the ADL ETE might be sufficient. Computing the fuel burn/flight time for the alternative route might require aircraft information (perhaps available in the ADL) and wind data, which may be difficult to provide.

3) The fuel burn/flight time for the alternative routes are taken from a lookup table local to ESM/FLO. In this model the estimated cost for the route-out depends primarily on the airport pair (part of the ADL) and the AFP. The great majority of AFP flights are controlled by a small number of AFPs, perhaps 4. The majority of flights for a given customer involve a small number of city pairs. A preprocessing stage would compute, for a fairly small combination of city pairs and AFPs, the ETE of the least-cost route between the selected city pairs that avoids the selected AFP, given typical (perhaps seasonal) wind conditions. (For FCAA08, over all flights, 230 city pairs capture 80% of the flight, 325 capture 90%. For individual carriers the city pair counts tend to be 15-30 total.) For the flights in a given AFP the real-time automation would look up the ETE for the city pair/AFP triplet for each flight and populate the internal data with this. (For flights with triples not listed in the look-up tables no route-out cost would be available.) The estimated ETE of the route-out flight could be compared to the ADL ETE, perhaps scaled by a factor based on the aircraft type (as given by the ADL) and then converted to a ground-delay minute equivalent using an up-to-date conversion factor.

In each case the flight-path costs are needed only for the potential route-out flights. The route-out benefits do not depend on these costs.

Figure 10:
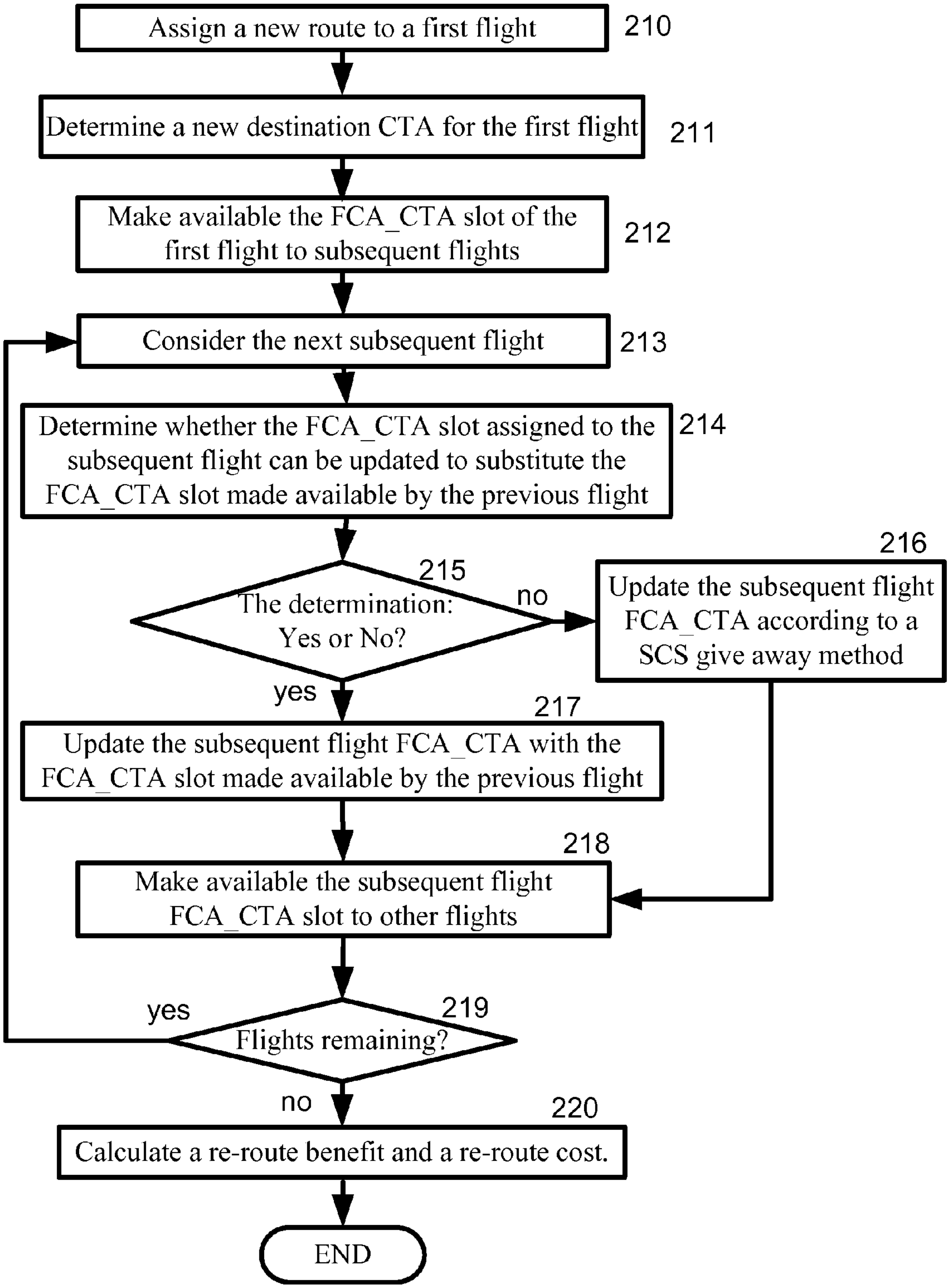
FIG. 10 presents a depiction of the preferred method for the present invention for evaluating flight substitution and reroute.

The flight substitution and reroute method of FIG. 10 can be summarized as a method of evaluating flight substitution and reroute for a plurality of flights, wherein each of the plurality of flights is assigned a route, a FCA controlled time of arrival (FCA_CTA) slot, a controlled time of departure (CTD), and a destination controlled time of arrival, wherein the plurality of flights are sorted according to the FCA_CTA slot to pass sequentially through an FCA, the method comprising:

a. assigning a new route to a first flight;

b. making available the FCA_CTA slot of the first flight to a subsequent flight to the first flight in the plurality of flights;

c. determining a new destination CTA for the first flight, wherein the determination is based on at least one of the following: i. the controlled time of departure (CTD) announced to customers for the first flight; ii. a flight air time for the route of the first flight; iii. availability of aircraft and crew of the first flight; iv. a flight air time for the new route of the first flight; v. a minimum notification time for the first flight; and vi. the current time;

d. assigning a new FCA_CTA slot to each of the subsequent fights according to a method comprising: i. determining whether the FCA_CTA slot assigned to the subsequent flight can be updated to substitute the FCA_CTA slot made available by a preceding flight to the subsequent flight; ii. if the subsequent flight FCA_CTA slot can be updated to substitute the FCA_CTA slot made available by the preceding flight, then update the subsequent flight FCA_CTA with the FCA_CTA slot made available by the preceding flight; iii. if the subsequent flight FCA_CTA slot cannot be updated to substitute the FCA_CTA slot made available by the preceding flight, then update the subsequent flight FCA_CTA according to a SCS give away method, in which a SCS give away time is calculated; and iv. making available the subsequent flight FCA_CTA slot to other flights in the plurality of flights;

e. calculating a re-route benefit as a function of at least one of the following: i. the FCA_CTA of the first flight; ii. the FCA_CTA of a last flight, the last flight having latest FCA_CTA slot among all flights in the plurality of flights; iii. difference between the new destination CTA and the destination CTA of the first flight; and iv. SCS give away time assigned to each of the subsequent flights; and f. calculating a re-route cost as a function of at least one of the following parameters of the route and the new route of the first flight: i. a flight distance; ii. a flight air time; and iii. a flight fuel cost.

The above tasks can be performed by different modules implemented in software or hardware. A route assignment module may be configured to assign a new route to a first flight. An assignment availability module may be configured to make the FCA_CTA slot of said first flight available for assignment to a subsequent flight. A time slot replacement module may be configured to assign a new FCA_CTA slot to the subsequent fight.

In the proposed method, the re-route benefit may be scaled by a scaling function to obtain a scaled re-route benefit, and the re-route cost may be scaled by a second scaling function to obtain a scaled re-route cost. In this invention, the plurality of flights can be selected as a subset of a larger group of flights. The system can each time select a different group of flights and calculate the re-route cost and re-route benefit for the selected group of flights when a flight is re-routed.

The proposed flight evaluation method can use the set of re-route benefits and re-route costs calculated for various group of flights to select a flight to be re-routed. The flight fuel cost of a route can be calculated using a flight planning tool. When a flight is re-routed, the new route can be the least cost path around the FCA. The new route can be determined using information about the FCA. The flight fuel cost of the old and new route can be calculated using at least one of the following: information about a wind data on each route; flight aircraft type; each flight route distance; and the route trajectory of each flight.

The fuel cost of a route can be calculated using a pre-defined table. The fuel cost pre-defined table is initialized based on at least one of the following: a departure airport and an arrival airport assigned to the flight; the CFA; a route between the departure airport and the arrival airport that avoids the CFA; the wind condition; and flight aircraft type.

The route flight air time can also be calculated using a pre-defined table. The route flight air time pre-defined table is initialized based on at least one of the following: a departure airport and an arrival airport assigned to the first flight; the CFA; a route between the departure airport and the arrival airport that avoids the CFA; the wind condition; and flight aircraft type.

Cost/Benefit Analysis for Manual Operations is described in the following paragraphs.

To use this information to guide operator decisions, we need some interaction with the customer, but we expect the required functionality will have some predicted features. We will need a column showing net route-out benefits for each flight, or perhaps cost and benefits separately. This will reflect the effects of routing that flight out of the AFP. This column will need to be updated with each new ADL and with each swap or cancellation.

For fights without route-out cost information this field should be blank or indicate no data available. For flights with negative impact this field should be blank or indicate negative route-out benefits. There should be a separate field at the top of the screen showing cumulative route out credits in the current session, following the delay savings model. There should be a new option to model or execute a route-out. The selected flight would lose its control information and its slot, and other flights would be moved forward according to existing compression rules.

The operator could repeatedly select high-benefit flights to out of the program until the delay costs were under control or there were no more attractive route-out options. At the end of the session the message for moving the route-out flights to their compressed slots and other flights up should be sent, and a message listing the flights to be independently routed out should be generated and transmitted as configured.

It is notable that, a tangible computer-readable medium encoded with instructions can be used to implement the flight substitution and reroute for a plurality of flights as presented in this disclosure. In such a system, execution of the instructions by one or more processors causes the "one or more processors" to perform the required functions. The system presented in FIG. 7 and the flow charts presented in FIG. 8 and FIG. 10 can be implemented using the above mentioned tangible computer-readable medium encoded with instructions.

The foregoing descriptions of the preferred embodiments of the present invention have been presented for purposes of illustration and description, and teach the best mode of the invention. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated.

The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of evaluating flight substitution and reroute for a plurality of flights, wherein each of said plurality of flights is assigned a route, a FCA controlled time of arrival (FCA_CTA) slot, a controlled time of departure, and a destination controlled time of arrival, wherein said plurality of flights are sorted according to said FCA_CTA slot to pass sequentially through a flight constrained area, the method comprising:

a. assigning a new route to a first flight, said first flight being one of said plurality of flights;

b. making the FCA_CTA slot of said first flight available for assignment to a subsequent flight, said subsequent flight being one of said plurality of flights;

c. determining a new destination controlled time of arrival for said first flight;

d. assigning a new FCA_CTA slot to said subsequent fight according to a method comprising:

i. determining whether said FCA_CTA slot assigned to said subsequent flight can be updated to substitute said FCA_CTA slot made available by a preceding flight, said preceding flight being one of said plurality of flights;

ii. if said subsequent flight FCA_CTA slot can be updated to substitute said FCA_CTA slot made available by said preceding flight, then replace said subsequent flight FCA_CTA with said FCA_CTA slot made available by said preceding flight;

iii, if said subsequent flight FCA_CTA slot cannot be updated to substitute said FCA_CTA slot made available by said preceding flight, then replace said subsequent flight FCA_CTA according to a slot credit substitution give away method, in which a slot credit substitution give away time is calculated; and iv. making said subsequent flight FCA_CTA slot available to other flights in said plurality of flights;

e. calculating a re-route benefit as a function of at least the following:

i. said FCA_CTA of said first flight;

ii. said FCA_CTA of a last flight, said last flight having latest FCA_CTA slot among all flights in said plurality of flights;

iii. difference between said new destination controlled time of arrival and said destination controlled time of arrival of said first flight; and iv. said slot credit substitution give away time assigned to each of said subsequent flights; and f. calculating a re-route cost as a function of at least the following parameters of said route and said new route of said first flight:

i. a flight distance;

ii. a flight air time; and iii. a flight fuel cost.

2. The method of claim 1, wherein said re-route benefit is determined by:

a. calculating a first metric by subtracting said FCA_CTA of said first flight from said FCA_CTA of said last flight;

b. calculating a second metric by subtracting said new destination controlled time of arrival of said first flight from said destination controlled time of arrival of said first flight;

c. calculating a third metric by adding said slot credit substitution give away time of each of said plurality of flights; and d. subtracting said third metric from the sum of said first and second metric.

3. The method of claim 1, wherein said slot credit substitution give away method comprises:

a. a direct or indirect data exchange between a plurality of airlines including a first airline and a second airline;

b. swapping a FCA_CTA slot assigned to a third flight selected from said first airline with a FCA_CTA slot assigned to a fourth flight selected from said second airline; and c. calculating said slot credit substitution give away time as a function of the difference between said FCA_CTA slot assigned to said third flight and said FCA_CTA slot assigned to said fourth flight.

4. The method of claim 1, wherein said re-route benefit is scaled by a first scaling function to obtain a scaled re-route benefit, and said re-route cost is scaled by a second scaling function to obtain a scaled re-route cost.

5. The method of claim 1, wherein the determination of a new destination controlled time of arrival for said first flight is based on at least the following:

a. said controlled time of departure announced to customers for said first flight;

b. a flight air time for said route of said first flight;

c. availability of aircraft and crew of said first flight;

d. a flight air time for said new route of said first flight;

e. a minimum notification time for said first flight; and f. the current time.

6. The method of claim 1, wherein said flight fuel cost of said route of said first flight and said new route of said first flight are calculated using a flight planning tool.

7. The method of claim 1, wherein said new route is the least cost path around said FCA.

8. The method of claim 1, wherein said new route is determined using information about said FCA.

9. The method of claim 1, wherein said flight fuel cost of said route of said first flight and said new route of said first flight are calculated using at least one of the following:

a. Information about a wind data on said route of said first flight and said new route of said first flight;

b. Aircraft type of said first flight;

c. said route distance of said first flight and said new route distance of said first flight; and d. said route trajectory of said first flight and said new route trajectory of said first flight.

10. The method of claim 1, wherein said fuel cost of said route of said first flight and said new route of said first flight are calculated using a pre-defined table.

11. The method of claim 10, wherein said fuel cost pre-defined table is initialized based on at least one of the following:

a. a departure airport and an arrival airport assigned to said first flight;

b. said CFA;

c. a route between said departure airport and said arrival airport that avoids said CFA;

d. a wind condition; and e. aircraft type of said first flight.

12. The method of claim 1, wherein said new route flight air time of said first flight is calculated using a pre-defined table.

13. The method of claim 12, wherein said new route flight air time pre-defined table is initialized based on at least one of the following:

a. a departure airport and an arrival airport assigned to said first flight;

b. said CFA;

c. a route between said departure airport and said arrival airport that avoids said CFA;

d. a wind condition; and e. aircraft type of said first flight.

14. A method of flight substitution and reroute for a plurality of flights, wherein each of said plurality of flights is assigned a route, a FCA controlled time of arrival (FCA_CTA) slot, a controlled time of departure, and a destination controlled time of arrival, wherein said plurality of flights are sorted according to said FCA_CTA slot to pass sequentially through a flight constrained area, the method comprising:

a. assigning a new route to a first flight, said first flight being one of said plurality of flights;

b. making the FCA_CTA slot of said first flight available for assignment to a subsequent flight, said subsequent flight being one of said plurality of flights;

c. assigning a new FCA_CTA slot to said subsequent fight according to a method comprising:

i. determining whether said FCA_CTA slot assigned to said subsequent flight can be updated to substitute said FCA_CTA slot made available by a preceding flight, said preceding flight being one of said plurality of flights;

ii. if said subsequent flight FCA_CTA slot can be updated to substitute said FCA_CTA slot made available by said preceding flight, then replace said subsequent flight FCA_CTA with said FCA_CTA slot made available by said preceding flight;

iii. if said subsequent flight FCA_CTA slot cannot be updated to substitute said FCA_CTA slot made available by said preceding flight, then replace said subsequent flight FCA_CTA according to a slot credit substitution give away method; and iv. making said subsequent flight FCA_CTA slot available to other flights in said plurality of flights.

15. The method of claim 14, further comprising: determining a new destination controlled time of arrival for said first flight, wherein the determination is based on at least the following:

i. said controlled time of departure announced to customers for said first flight;

ii. a flight air time for said route of said first flight;

iii. availability of aircraft and crew of said first flight;

iv. a flight air time for said new route of said first flight;

v. a minimum notification time for said first flight; and vi. the current time.

16. The method of claim 14, wherein said slot credit substitution give away method comprises:

a. a direct or indirect data exchange between a plurality of airlines including a first airline and a second airline;

b. swapping a FCA_CTA slot assigned to a third flight selected from said first airline with a FCA_CTA slot assigned to a forth flight selected from said second airline; and c. calculating said slot credit substitution give away time as a function of the difference between said FCA_CTA slot assigned to said third flight and said FCA_CTA slot assigned to forth second flight.

17. The method of claim 16, further comprising:

a. calculating a re-route benefit as a function of at least one of the following:

i. said FCA_CTA of said first flight;

ii. said FCA_CTA of a last flight, said last flight having latest FCA_CTA slot among all flights in said plurality of flights;

iii. difference between said new destination controlled time of arrival and said destination controlled time of arrival of said first flight; and iv. slot credit substitution give away time assigned to each of said subsequent flights; and b. calculating a re-route cost as a function of at least one of the following parameters of said route and said new route of said first flight:

i. a flight distance;

ii. a flight air time; and iii. a flight fuel cost.

18. The method of claim 17, wherein said re-route benefit is determined by:

a. calculating a first metric by subtracting said FCA_CTA of said first flight from said FCA_CTA of said last flight;

b. calculating a second metric by subtracting said new destination controlled time of arrival of said first flight from said destination controlled time of arrival of said first flight;

c. calculating a third metric by adding said slot credit substitution give away time of all said plurality of flights; and d. subtracting said third metric from the sum of said first and said second metric.

19. A system of flight substitution and reroute for a plurality of flights, wherein each of said plurality of flights is assigned a route, a FCA controlled time of arrival (FCA_CTA) slot, a controlled time of departure, and a destination controlled time of arrival, wherein said plurality of flights are sorted according to said FCA_CTA slot to pass sequentially through a flight constrained area, the method comprising:

a. a route assignment module configured to assign a new route to a first flight, said first flight being one of said plurality of flights;

b. an assignment availability module configured to make the FCA_CTA slot of said first flight available for assignment to a subsequent flight, said subsequent flight being one of said plurality of flights;

c. a time slot replacement module configured to assign a new FCA_CTA slot to said subsequent fight according to a method comprising:

i. determining whether said FCA_CTA slot assigned to said subsequent flight can be updated to substitute said FCA_CTA slot made available by a preceding flight, said preceding flight being one of said plurality of flights;

ii. if said subsequent flight FCA_CTA slot can be updated to substitute said FCA_CTA slot made available by said preceding flight, then replace said subsequent flight FCA_CTA with said FCA_CTA slot made available by said preceding flight;

iii. if said subsequent flight FCA_CTA slot cannot be updated to substitute said FCA_CTA slot made available by said preceding flight, then replace said subsequent flight FCA_CTA according to a slot credit substitution give away method; and iv. making said subsequent flight FCA_CTA slot available to other flights in said plurality of flights.

20. The system of flight substitution and reroute for a plurality of flights according to claim 19, wherein said slot credit substitution give away method comprises:

a. a direct or indirect data exchange between a plurality of airlines including a first airline and a second airline;

b. swapping a FCA_CTA slot assigned to a third flight selected from said first airline with a FCA_CTA slot assigned to a forth flight selected from said second airline.

* * * * *